United States Patent
Want et al.

(10) Patent No.: US 8,405,572 B1
(45) Date of Patent: Mar. 26, 2013

(54) PRIVACY DISPLAY

(75) Inventors: Roy Want, Los Altos, CA (US); Richard Carl Gossweiler, III, Sunnyvale, CA (US); Colin Albright McDonough, St. Louis, MO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/311,897

(22) Filed: Dec. 6, 2011

(51) Int. Cl.
*G09G 5/00* (2006.01)

(52) U.S. Cl. ............... 345/4; 345/1.1; 345/32; 345/102; 345/87; 345/88; 345/629; 345/83; 428/1.51; 428/426; 349/122; 349/123; 349/178

(58) Field of Classification Search ...... 345/4, 629–641, 345/690, 32, 1.1, 87, 102, 88, 83; 349/122, 349/123, 178; 428/1.51, 426
See application file for complete search history.

(56) References Cited

U.S. PATENT DOCUMENTS

| | | | |
|---|---|---|---|
| 6,445,434 B2 | 9/2002 | Takato et al. | |
| 7,633,586 B2 | 12/2009 | Winlow et al. | |
| 7,916,223 B2 * | 3/2011 | Kitagawa et al. | 349/15 |
| 7,956,821 B2 * | 6/2011 | Ikeno et al. | 345/4 |
| 7,995,153 B2 * | 8/2011 | Chang | 349/15 |
| 2005/0063029 A1 * | 3/2005 | Khazova et al. | 359/3 |
| 2005/0243265 A1 * | 11/2005 | Winlow et al. | 349/178 |
| 2008/0025645 A1 * | 1/2008 | Jakobson et al. | 382/300 |
| 2009/0067156 A1 * | 3/2009 | Bonnett et al. | 362/97.2 |
| 2009/0262290 A1 * | 10/2009 | Sampica et al. | 349/122 |
| 2010/0231618 A1 | 9/2010 | Hekstra et al. | |
| 2010/0295755 A1 | 11/2010 | Broughton et al. | |

FOREIGN PATENT DOCUMENTS

WO  WO-2008056586 A1  5/2008

* cited by examiner

*Primary Examiner* — Lun-Yi Lao
*Assistant Examiner* — Olga Merkoulova
(74) *Attorney, Agent, or Firm* — Remarck Law Group PLC (57) ABSTRACT

A display device can include a housing, a processor, and a display assembly. The processor can be arranged within the housing. The display assembly can be operably coupled to the processor and arranged within the housing. The display assembly can include a first display, a privacy filter, and a second display. The first display can output a first portion of the display. The second display can output a second portion of the display. The privacy filter and the first and second displays can be arranged such that the first portion of the display assembly is filtered by the privacy filter to be viewable in a first viewable arc. The second portion of the display assembly can be viewable in a second viewable arc that is different than the first viewable arc. The first and second displays can be LCD's.

19 Claims, 5 Drawing Sheets

PRIVACY DISPLAY

FIELD

The present disclosure relates to a privacy display and related techniques for using a privacy display on a mobile device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "user device" refers to a computing device that typically includes a user interface, a display, and a processor. User devices may include non-portable or stationary devices such as a desktop computer. User devices may also include mobile devices such as mobile phones, laptop computers, personal digital assistants, and tablet computers. Mobile devices may selectively communicate via one or more networks, such as a mobile telephone network, the Internet, and the like.

Privacy filters have been used on viewing screens for protecting sensitive information. Specifically, a privacy filter is used to darken side viewing of the display to prevent others from reading information displayed. Privacy filters, however, are often bulky and cumbersome such that they are not incorporated on mobile devices. Further, in some instances, it may be desirable to protect or hide sensitive information that is displayed on only portions of the viewable screen.

SUMMARY

In accordance with some embodiments of the present disclosure, a display device is disclosed. The display device can include a housing, a processor, and a display assembly. The processor can be arranged within the housing. The display assembly can be operably coupled to the processor and arranged within the housing. The display assembly can include a first display, a privacy filter, and a second display. The first and second displays can comprise first and second LCD's, respectively. The first LCD can output a first portion of the display assembly. The second LCD can output a second portion of the display assembly. The privacy filter and the first and second LCD's can be arranged such that the first portion of the display assembly is filtered by the privacy filter to be viewable in a first viewable arc. The second portion of the display assembly can be viewable in a second viewable arc that is different than the first viewable arc. In one example, the display device may be incorporated on a mobile computing device such as a mobile phone, tablet computer or laptop computer for example.

In accordance with various embodiments of the present disclosure, a display device is disclosed. The display device can include a housing, a first display, a privacy filter, and a second display. The housing can have a user interface portion. The first and second displays can comprise first and second LCD's, respectively. The first LCD can be disposed in the housing. The second LCD can be disposed relative to the privacy filter such that the privacy filter is interposed between the first and second LCD's. The first LCD can be configured to display a first output. The second LCD can be configured to display a second output. The first output can be displayed on the first LCD and be viewable through the second LCD only within a viewable arc of the privacy filter.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
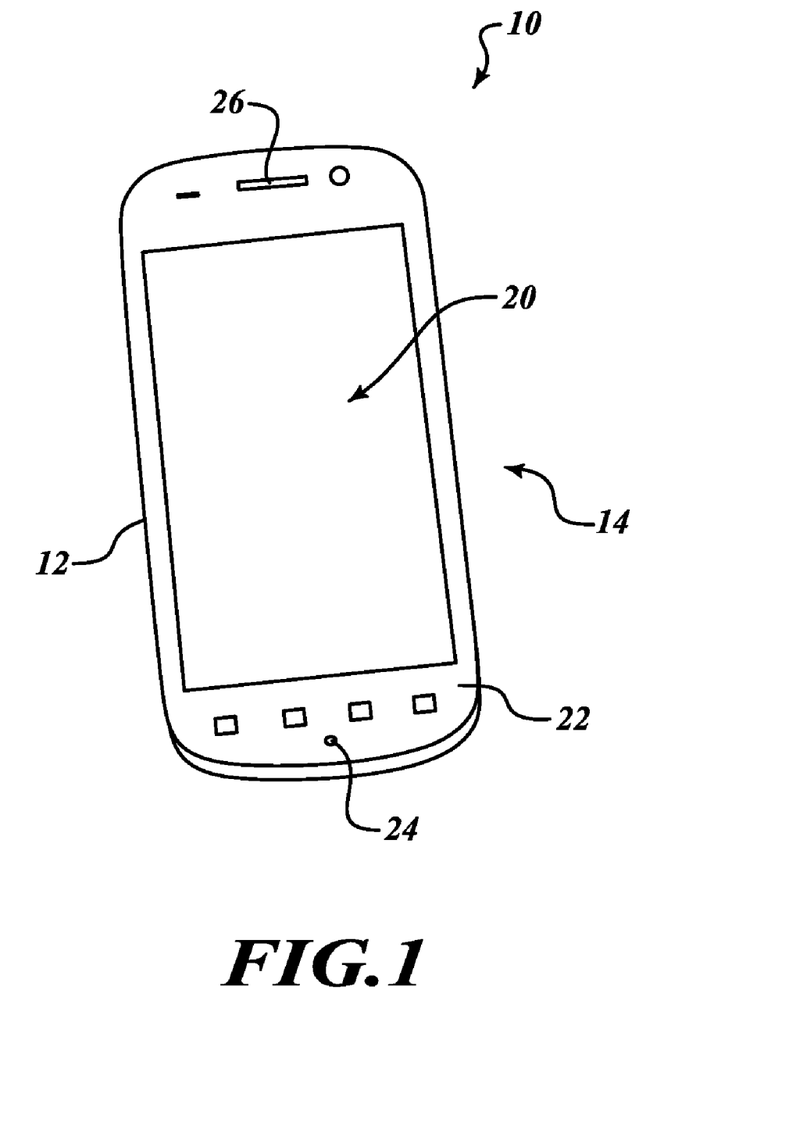
FIG. 1 is a front perspective view of a mobile device incorporating a privacy display according to some embodiments of the present disclosure.
Figure 2:
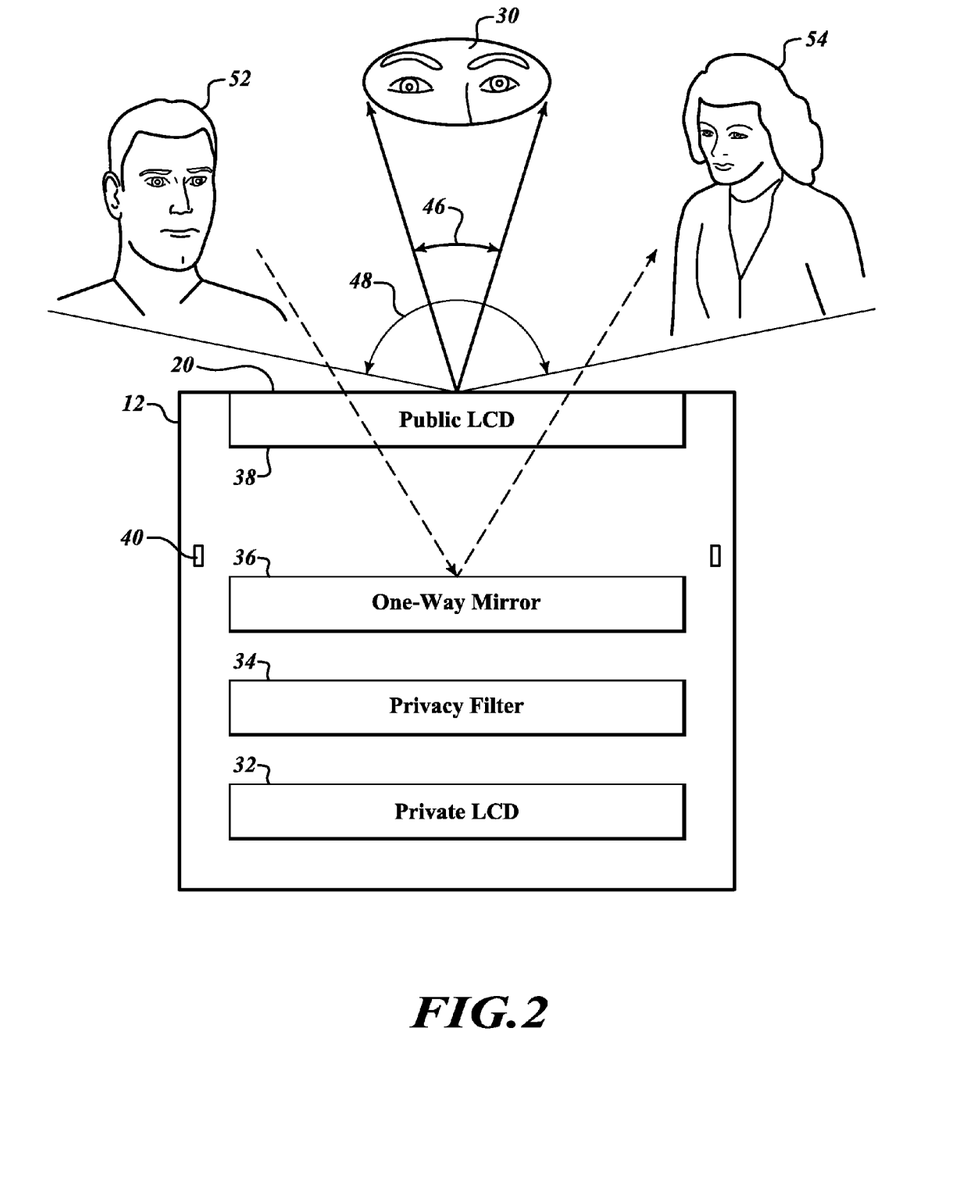
FIG. 2 is a sectional view of the mobile device of FIG. 1 illustrating a user viewing the display through a first viewable arc and a pair of bystanders viewing the display through a second viewable arc.

With initial reference now to FIG. 1, a display device constructed in accordance to one example of the present disclosure is shown and generally identified at reference numeral 10. The display device 10 may be a laptop computer, a mobile phone, a tablet computer, or the like. The display device 10 generally includes a housing 12 that incorporates a user interface 14. The user interface 14 includes a viewable screen or display assembly 20 and a plurality of buttons 22, as well as a microphone 24 and a speaker 26. The display assembly 20 may be a touch display as shown, such as a capacitive sensing display. The display device 10 may additionally or alternatively include a physical character layout, e.g., a partial QWERTY-based keyboard. The display assembly 20 may display information to, and receive input from, a user 30 (FIG. 2). For example, the user 30 may input information to the display device 10 via the user interface 14 including the display assembly 20, the buttons 22, and/or the microphone 24.

With continued reference to FIG. 1 and additional reference now to FIG. 2, the display assembly 20 will be further described. The display assembly 20 generally incorporates a first or private display 32, a privacy filter 34, a one-way mirror 36, and a second or public display 38. According to the examples shown, the private display 32 may be an LCD display such as a transmissive LCD that incorporates a backlight, however other LCD configurations are contemplated. Moreover, other display types may be additionally or alternatively incorporated such as, but not limited to, LED displays including OLED and AMOLED displays. The privacy filter 34 may include a polarized filter having a material that only permits light to pass through in a limited range of directions, thereby limiting visibility of the information displayed on the private display 32 to a limited viewable arc, as will be described in greater detail herein.

The one-way mirror 36 may be arranged to include or cooperate with a light source 40 disposed in the housing 12 generally adjacent to the one-way mirror 36. The light source 40 may be configured to scatter light off of the one-way mirror 36. In one example, the light source 40 may be a set of solid state light emitting diodes (LEDs) disposed around the inner housing 12. In another example, the light source 40 may be an electroluminescent material that may be configured to illuminate upon application of a voltage. Other configurations are contemplated. The public display 38 may be a transmissive LCD, for example. Other LCD configurations are contemplated. As will become appreciated from the following discussion, the display assembly 20 may be configured to display some information on the public display 38 and other information on the private display 32. The display assembly 20 is configured to only allow the information displayed on the private display 32 to be viewable through a first viewable arc 46 by the user 30. Other information displayed on the public display 38 may be viewable through a second viewable arc 48 such as by bystanders 52 and 54. In this way, the display assembly 20 of the display device 10 may be configured to display sensitive information such as bank account numbers, passwords, and the like on the private display 32 such that the information may only be viewable by the user 30 through the first viewable arc 46.

Figure 3:
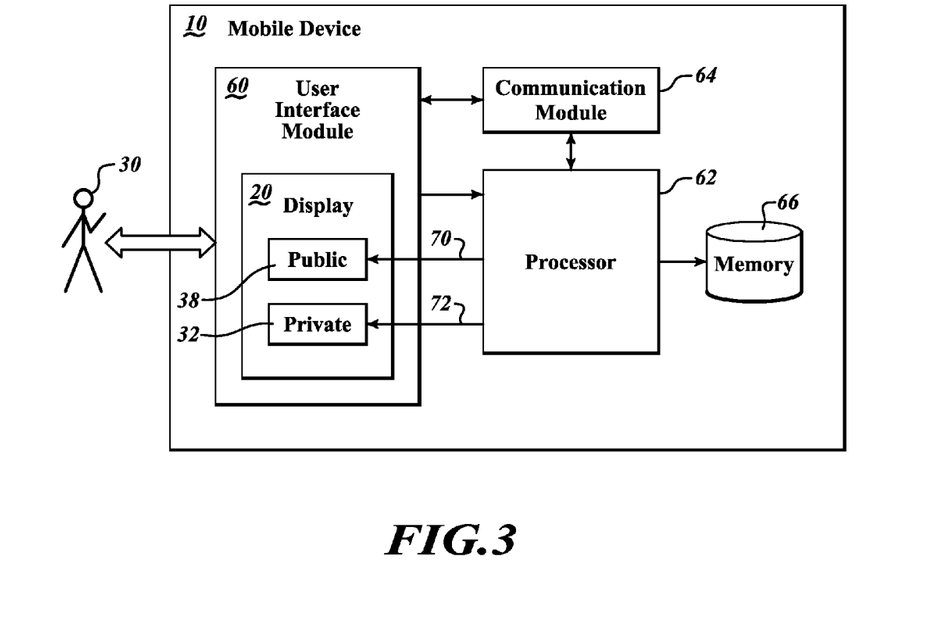
FIG. 3 is a functional block diagram of the mobile device of FIG. 1 according to some implementations of the present disclosure.

Referring now to FIG. 3, an example of the display device 10 is shown in more detail. The display device 10 may include a user interface module 60, a processor 62, a communication module 64, and a memory 66. The user interface module 60 can include and control the display assembly 20. Specifically, the user interface module 60 may generate or manipulate the information to be displayed to the user 30 via the display assembly 20. The user interface module 60 may receive information from and communicate information to the processor 62 and the communication module 64. While the display device 10 is shown as generally including the user interface module 60, the processor 62, the communication module 64, and memory 66, the display device 10 may also include other suitable computing components.

In general, a user 30 may communicate with the display device 10 via the user interface 14 including the display assembly 20 and the buttons 22. In particular, the display assembly 20 may display information to the user 30 and receive input from the user 30. The processor 62 may control most operations of the display device 10. The processor 62, therefore, may communicate with each of the user interface module 60, the communication module 64, and the memory 66. For example, the processor 62 may perform tasks such as, but not limited to, loading/controlling an operating system of the display device 10, loading/configuring communication parameters for the communication module 64 and controlling various parameters of the user interface module 60. The processor 62 may also perform the loading/controlling of software applications, the controlling of memory storage/retrieval operations, e.g., for loading of the various parameters.

The processor 62 may interpret information input by the user 30 through the user interface 14. The processor 62 may determine a public display portion and a private display portion. The processor 62 may communicate a public display signal 70 to the public display 38 and communicate a private display signal 72 to the private display 32. In this regard, the processor 62 sends some information identified as suitable for public viewing to be displayed on the public display 38 while sending other information identified as sensitive or private for viewing only by the user 30 to be displayed on the private display 32. As used herein the term "information" may be characters including letters, numbers, signs and the like. The information may also include graphics, pictures, symbols and the like.

According to one example of the present disclosure, the processor 62 may determine whether certain information is dedicated for sending to the public display 38 as compared to other information that is dedicated to sending to the private display 32 based upon an indicator associated with such information. The indicator may be a tag associated with a given field of information that may identify a password or other protected entry field (HTML5, etc.) that may be associated with protected or otherwise sensitive data. It is contemplated that a user 30 may additionally or alternatively assign information to be displayed on the private display 32 manually. Such information may also be associated with a private indicator through the settings of the display device 10. In this regard, a privacy setting manager may be incorporated that provides a user with options for assigning a private indicator to certain information. The content of the information can be contact information, location information, account information, browser information or any other information the user deems as private. In other examples, a user may assign a private indicator to individual applications. For example, a user may identify particular applications, such as banking applications for example, that can be selected for all or partial display on the private display 32. Additionally, the privacy settings manager may include a privacy setting mode that a user can select to associate subsequent information for display on the private display 32.

The communication module 64 controls communication between the display device 10 and other devices. For example only, the communication module 64 may provide for communication between the display device 10 and other users via a cellular telephone network, and/or between the display device 10 and a wireless network. Examples of wireless networks include, but are not limited to, the Internet, a wide area network, a local area network, a satellite network, a telecommunications network, a private network, and combinations of these.

Figure 4:
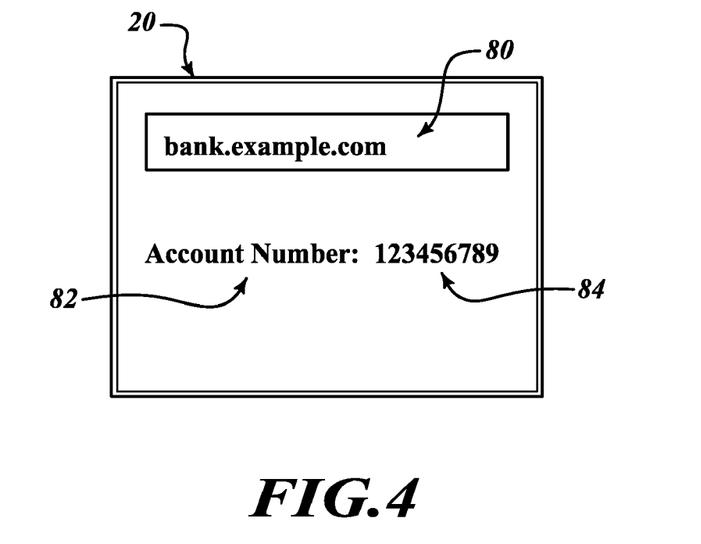
FIG. 4 is a plan view of the display of the mobile device of FIG. 1 illustrating a first field "bank.example.com" and a second field "Account Number:" both displayed on a second or public liquid crystal display (hereinafter "LCD") and a third field "123456789" displayed on a first or private LCD, wherein all of the first, second, and third fields are viewable by the user through the first viewable arc.
Figure 5:
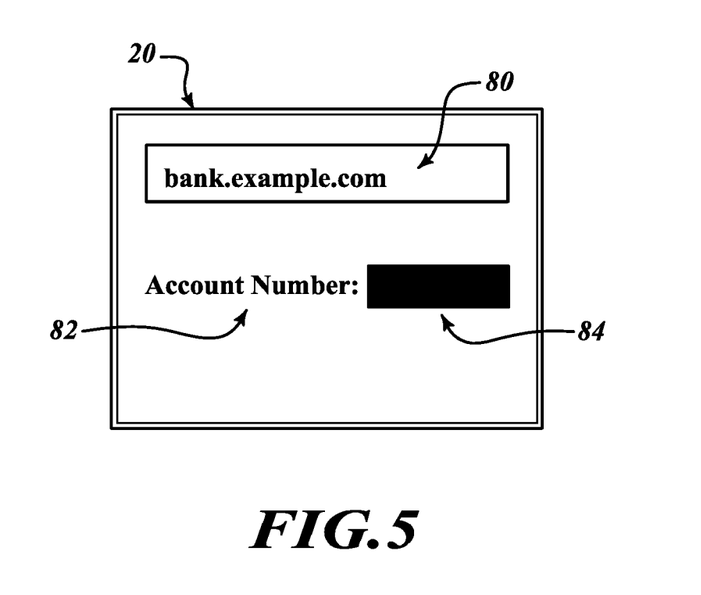
FIG. 5 is a plan view of the display of FIG. 4 illustrating the third field as being obscured as viewed through the second viewable arc.

With reference now to FIGS. 4 and 5, one example of using the display assembly 20 according to the present disclosure will be described. At the outset, FIG. 4 illustrates the display assembly 20 as viewed by the user 30 through the first viewable arc 46 (FIG. 2). Specifically, the display assembly 20 includes a first field 80, a second field 82, and a third field 84. The first field 80 includes "bank.example.com" communicated by the processor 62 through the public display signal 70 to the public display 38. Similarly, the second field 82 includes "Account Number:" communicated through the public display signal 70 to the public display 38. The third field 84 includes "123456789" communicated through the private display signal 72 to the private display 32. Notably, the third field 84 is still viewable by the user 30 through the first viewable arc 46. Explained further, the user 30 is able to view through the privacy filter 34 to the private display 32 when the user 30 is in a position within the first viewable arc 46 illustrated in FIG. 2. It will be appreciated that the public display 38 will be transparent in corresponding areas directly above the third field 84, or more generally in areas above fields dedicated for private viewing.

With particular attention now to FIG. 5, the display assembly 20 is configured to display all of the first, second, and third fields 80, 82, and 84 as explained above with respect to FIG. 4. However, in FIG. 5, the resulting view is of a viewable arc outside of the first viewable arc 46. For example, the view that results in FIG. 5 may be that of the second viewable arc 48, outside of the first viewable arc 46 as viewed by one of the bystanders 52 or 54. In this regard, the information viewable by another bystander that is occupying a position outside of the first viewable arc 46 will view the third field 84 as blacked out or otherwise obscured. The information displayed in the third field 84 ("123456789") is not viewable by anyone looking toward the display assembly 20 from a viewing angle outside of the first viewable arc 46. As can be appreciated, the privacy filter 34 disposed intermediate the public display 38 and the private display 32 will preclude viewing of any information displayed on the private display 32 (or in this case, the third field 84).

Figure 6:
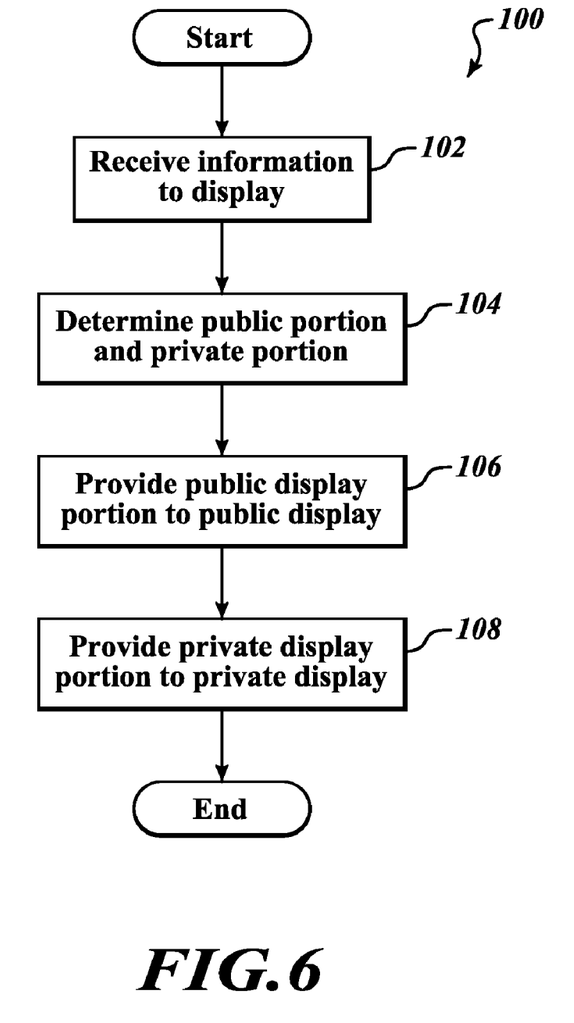
FIG. 6 is a flow diagram of a technique for using the privacy display according to some implementations of the present disclosure.

Referring now to FIG. 6, an example of a technique 100 for using the display device 10 according to one example of the present disclosure is illustrated. At 102, the processor 62 receives information to display from the user interface module 60. At 104, the processor 62 determines from the information, a public display portion and a private display portion. At 106, the processor 62 communicates the public display signal 70 to the public display 38. At 108, the processor 62 communicates the private display signal 72 to the private display 32.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A display device comprising:
   a housing;
   a processor arranged within the housing that receives information to display and determines a private portion and a public portion of the information to display; and
   a display assembly operably coupled to the processor and arranged within the housing, the display assembly including:
   a first LCD that outputs the private portion of the display assembly;
   a privacy filter;
   a second LCD that outputs the public portion of the display assembly, the privacy filter and the first and second LCD's being arranged such that the private portion of the display assembly is filtered by the privacy filter to be viewable in a first viewable arc, wherein the public portion of the display assembly is viewable in a second viewable arc different than the first viewable arc;
   a one-way mirror disposed between the second LCD and the privacy filter; and
   a light source adjacent to the one-way mirror.

2. The display device of claim 1 wherein the second viewable arc is greater than the first viewable arc.

3. The display device of claim 1 wherein the processor determines the private portion based on an indicator, wherein the indicator comprises a password entry field.

4. The display device of claim 1 wherein the processor provides the private portion to the first LCD and the public portion to the second LCD.

5. The display device of claim 4 wherein the second LCD is transparent in corresponding areas displaying private portion information on the first LCD.

6. The display device of claim 1, further comprising a mobile computing device that incorporates the display device.

7. The display device of claim 1 wherein the light source comprises at least one light emitting diode disposed within the housing and configured to transmit light toward the one-way mirror.

8. A display device, comprising:
   a housing having a user interface portion;
   a first display disposed in the housing;
   a privacy filter disposed adjacent the first display;
   a second display disposed adjacent the privacy filter such that the privacy filter is interposed between the first and second displays, wherein the first display is configured to display a first output and the second display is configured to display a second output wherein the first output displayed on the first display is viewable through the second display and only within a viewable arc of the privacy filter;
   a one-way mirror disposed between the second display and the privacy filter; and
   a light source adjacent to the one-way mirror.

9. The display device of claim 8 wherein the light source comprises at least one light emitting diode disposed within the housing and configured to transmit light toward the one-way mirror.

10. The display device of claim 8, further comprising a processor that receives information to display and determines a private portion and a public portion of the information to display.

11. The display device of claim 10 wherein the processor determines the private portion based on an indicator, wherein the indicator comprises a password entry field.

12. The display device of claim 11 wherein the first display comprises a first LCD.

13. The display device of claim 12 wherein the second display comprises a second LCD.

14. The display device of claim 13 wherein the processor provides the private portion to the first LCD and the public portion to the second LCD.

15. The display device of claim 14 wherein the second LCD is transparent in corresponding areas displaying private portion information on the first LCD.

16. The display device of claim 8 wherein the privacy filter is a polarized filter.

17. The display device of claim 8, further comprising a mobile computing device that incorporates the display device.

18. A computer-implemented method comprising:
   receiving information to display;
   determining a private portion of the information;
   determining a public portion of the information;
   providing the private portion to a first display wherein the first display comprises a first LCD at a first location within a mobile device;
   wherein the private portion of the information is viewable only within a first viewable arc;
   providing the public portion to a second display wherein the second display comprises a second LCD, at a second location within the mobile device;
   wherein the first location is on one side of a privacy filter and a one-way mirror and the second location is on an opposite side of the privacy filter and the one-way mirror.

19. The computer-implemented method of claim 18, further comprising:

displaying the private portion on the first display on an opposite side of a privacy filter relative to the second display and at a location corresponding to a transparent portion of the second display.

\* \* \* \* \*